United States Patent Office 3,107,249
Patented Oct. 15, 1963

3,107,249
BIS-QUATERNARY AMMONIUM SUBSTITUTED ALKANES
Chester John Cavallito and Allan Poe Gray, Decatur, Ill., assignors to Neisler Laboratories, Inc., Decatur, Ill., a corporation of Delaware
No Drawing. Filed Apr. 21, 1954, Ser. No. 425,730
5 Claims. (Cl. 260—286)

This invention relates to $\alpha,\omega$-bis-quaternary-ammonium substituted $C_3$ to $C_{12}$ alkane salts wherein one quaternary ammonium group includes a benzopyridine nucleus, containing up to three fused rings and up to six hydrogen atoms on the pyridine portion of said nucleus, attached through the nitrogen to the alkane portion of the molecule, and, the other quaternary-ammonium group contains up to one N-heterocyclic ring and not more than ten carbon atoms.

Among the compounds included within the scope of the invention are those more particularly illustrated by the following formula:

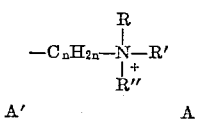

wherein $n$ is an integer from three to twelve, inclusive, and R and R' are lower-alkyl radicals which may be the same, different, or R and R' may be joined together to form a saturated or unsaturated heterocyclic ring, wherein R" is lower-alkyl or aralkyl, or N, R, R' and R" may constitute an unsaturated heterocyclic ring, and wherein the unsatisfied valence is attached to the ring nitrogen of a benzopyridine or benzohydropyridine derivative selected from the group consisting of quinoline, isoquinoline, di- and tetrahydroquinolines and -isoquinolines and certain substituted derivatives of these radicals, and wherein A and A' are anions, at least one of which is halogen from the group consisting of chlorine, bromine and iodine.

The compounds of the present invention are crystalline solids, having relatively high melting points and are soluble in water. The compounds have utility as hypotensive agents.

Preparation of the compounds of the present invention may be readily accomplished by providing a suitable haloalkyl quaternary ammonium halide having the formula:

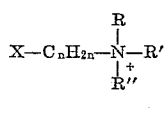

wherein R, R', R" and A have the previously assigned values, and wherein X is a halogen selected from the group consisting of chlorine, bromine or iodine. This starting material is reacted with an appropriate benzopyridine or N-(lower-alkyl) benzohydropyridine material, in a suitable solvent. Representative solvents which are suitable include, for example, acetonitrile, an alcohol such as ethyl alcohol, isopropyl alcohol, propyl alcohol, isoamyl alcohol, et cetera, mixtures of dioxane and a suitable alcohol, and similar polar solvents and solvent mixtures. Appropriate benzopyridine and benzohydropyridine material which are suitable include, for example, quinoline, 1-methyl-1,2,3,4-tetrahydroquinoline, isoquinoline, 2-methyl-1,2,3,4-tetrahydroisoquinoline, 7-hydroxyquinoline, 8-hydroxyquinoline, 8-methoxyquinoline, 4-acetamidoisoquinoline, 1-carbethoxyisoquinoline, 4- bromoisoquinoline, 1-methylisoquinoline, 3-methylisoquinoline, 6,7-dimethoxyisoquinoline, 6,7-diamethoxy-2-methyl-1,2,3,4-tetrahydroisoquinoline, 6,7-methylenedioxyisoquinoline, 2-butyl-tetrahydroisoquinoline, quinaldine, benz substituted benzopyridines such as phenanthridine, 5-methyl-5,6-dihydrophenanthridine, benzo[f]quinoline, 4-methyl-1,2,3,4-tetrahydrobenzo[f]quinoline, benzo[h]-quinoline, 2-methyl-2,3-dihydro-1-benzo[de]isoquinoline, et cetera. Reaction is usually conducted at a temperature from about room temperature to about 150 degrees centigrade, however, other temperatures may be employed About 80 degrees centigrade is preferred. Portions of the reactants used are dependent upon ease of separation and availability of the starting materials, generally approximately equimolar proportions of the reactants are conveniently used. After heating the mixture, the compounds of the present invention will begin to precipitate and settle out from the reaction mixture. In the event no precipitation occurs, either may be added to the reaction mixture to cause precipitation.

Representative haloalkyl quaternary ammonium salts which are suitable in the process of the present invention include those materials which have been described and claimed in a copending application of C. J. Cavallito and A. P. Gray, Serial 406,052, filed January 25, 1954, now U.S. Patent No. 2,817,664, and include, for example, 3-bromopropyldiethylmethylammonium bromide, 3-bromopropyltrimethylammonium bromide, 6-bromohexyltrimethylammonium bromide, 5-bromopentyltrimethylammonium bromide, 2-chloropropyltrimethylammonium bromide, 10-bromodecyltrimethylammonium bromide, 3-bromopropyl-N-methylpiperidinium bromide, 3-bromopropyl-N-methylpyrrolidinium bromide, 3-bromopropylbenzyldimethylammonium bromide, 7-chloroheptyl-N-propylmorpholinium chloride, 10-iododecyltrimethylammonium iodide, 8-iodooctyl-N-benzylpiperidinium iodide, 3-bromopropylpyridinium chloride, et cetera, that is, a material comprising an alkane hydrocarbon chain having between three and twelve carbon atoms, and substituted both by a halogen and, omega to the halogen, by a suitable quaternary ammonium group,

in which R, R' and R" are as previously defined.

Preparation of derivatives of benzohydropyridine bases such as 2,3-dihydro-benzo[de]isoquinoline may alternatively be prepared by either of the following methods:

(a) Reaction of naphthalic anhydride with a tertiary-aminoalkyl amine,

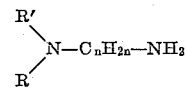

in which R, R' and $n$ are as previously defined, followed by reduction of the resulting substituted naphthalimide, as for example with lithium aluminum hydride, to yield the 2-(tertiaryaminoalkyl) - 2,3-dihydro-1-benzo[de]isoquinoline, which is converted to the bis-quaternary by treatment with a suitable alkylating agent such as methyl iodide;

(b) Reaction of a metal salt of naphthalimide with a tertiary aminoalkyl halide,

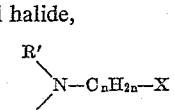

to yield the substituted naphthalimide which is reduced and quaternized as described.

The following examples illustrate certain procedures whereby some of the compounds of the present invention may be prepared, but are not to be construed as limiting.

Example 1

An acetonitrile solution of 3.9 grams (0.03 mole) of isoquinoline and 8.6 grams (0.025 mole) of crude (90 percent pure) 6-bromohexyltrimethylammonium bromide was refluxed on the steam bath for sixteen hours. The precipitate which formed no cooling was recrystallized from n-propyl alcohol and ether to yield 8.5 grams (78 percent) of 1-(isoquinolinium)-6-(trimethylammonium)-hexane dibromide, melting point 199–201 degrees centigrade.

*Analysis.*—Calculated: C, 50.01; H, 6.54; Br, 36.97. Found: C, 49.96; H, 6.68; Br, 37.00.

Example 2

An acetonitrile solution of 80.0 grams (0.3 mole) of 3-bromopropyltrimethylammonium bromide and 60.0 grams (0.46 mole) of isoquinoline (redistilled) was refluxed on the steam bath for sixteen hours. The precipitate which formed on cooling was collected and twice recrystallized from n-propyl alcohol to yield 97.8 grams (83 percent) of 1-(isoquinolinium)-3-(trimethylammonium)-propane dibromide, melting point 218–219 degrees centigrade.

*Analysis.*—Calculated: C, 46.17; H, 5.69; Br, 40.96. Found: C, 46.70; H, 5.67; Br, 40.87.

Example 3

An acetonitrile solution of 9.6 grams of 90 percent pure 3 - bromopropyl - N - methylpyrrolidinium bromide (0.03 mole) and 5.8 grams (0.045 mole) of redistilled isoquinoline was refluxed sixteen hours on the steam bath. The dark precipitate which formed on cooling was recrystallized from isopropyl alcohol to give 8.9 grams (71 percent) of 1-(isoquinolinium)-3-(N-methylpyrrolidinium)-propane dibromide, melting point 137–144 degrees centigrade.

*Analysis.*—Calculated: C, 49.05; H, 5.82; Br, 38.40. Found: C, 49.31; H, 6.11; Br, 38.07.

Example 4

3-bromopropyl-N-methylmorpholinium bromide, melting point 144–145 degrees centigrade, was prepared in a manner similar to that described in the copending application of C. J. Cavallito and A. P. Gray, Serial 406,052, filed January 25, 1954.

*Analysis.*—Calculated: Br, 26.37. Found: Br, 26.58.

To 5.2 grams (0.017 mole) of the 3-bromopropyl-N-methylmorpholinium bromide dissolved in acetonitrile was added 4.4 grams (0.034 mole) of isoquinoline and the solution was refluxed 24 hours on the steam bath. The crystalline precipitate was collected and recrystallized from isopropyl alcohol to yield 6.6 grams (90 percent) of 1-(isoquinolinium)-3-(N-methylmorpholinium) propane dibromide, melting with decomposition at 162 degrees centigrade.

*Analysis.*—Calculated: Br, 36.98. Found: Br, 36.99.

Example 5

3 - bromopropylpyridinium bromide, melting point 128–129 degrees centigrade, was prepared in a manner similar to that described in the copending application of C. J. Cavallito and A. P. Gray, Serial 406,052, filed January 25, 1954.

*Analysis.*—Calculated: Br, 28.44. Found: Br, 28.92.

To a solution of 5.6 grams (0.02 mole) of the 3-bromopropylpyridinium bromide in 150 milliliters of acetonitrile and fifteen milliliters of ethanol was added 5.2 grams (0.04 mole) of isoquinoline. After 21 hours refluxing the solution was concentrated to about half its volume and the precipitate which formed on cooling was collected and twice recrystallized from ethanol and ethyl acetate. A yield of 4.8 grams (59 percent) of 1-(isoquinolinium)-3-(pyridinium)-propane dibromide, melting point 203–204 degrees centigrade, was obtained.

*Analysis.*—Calculated: C, 49.78; H, 4.42; Br, 38.97. Found: C, 49.45; H, 4.59; Br, 38.77.

Example 6

Three grams (0.016 mole) of 4-acetamidoisoquinoline and 4.9 grams (0.017 mole) of 3-bromopropyl-N-methylpyrrolidinium bromide dissolved in acetonitrile was refluxed on the steam bath for 24 hours. The crystalline precipitate from the cool solution was recrystallized twice from isopropyl alcohol containing a small amount of ethanol to yield 5.25 grams (69 percent) of 1-(4-acetamidoisoquinolinium) - 3 - (N-methylpyrrolidinium)-propane dibromide, melting point 193–194 degrees centigrade.

*Analysis.*—Calculated: Br, 33.77. Found: Br, 33.66.

Example 7

To 12.5 grams (0.048 mole) of 3-bromopropyltrimethylammonium bromide dissolved in absolute ethanol was added 5.9 grams (0.04 mole) of N-methyltetrahydroisoquinoline and the solution was refluxed on the steam bath for ten hours. The product was precipitated from the cooled solution by the addition of ethyl acetate, recrystallized from isopropyl alcohol and then from ethanol. A yield of 4.4 grams (27 percent) of 1-(2-methyl - 1,2,3,4 - tetrahydroisoquinolinium)-3-(trimethylammonium)-propane dibromide, melting point 255–256 degrees centigrade, was obtained.

*Analysis.*—Calculated: Br, 39.15; C, 47.06; H, 6.93. Found: Br, 39.13; C, 46.63; H, 6.80.

Example 8

An acetonitrile solution of 1.0 gram (0.0069 mole) of 7-hydroxyquinoline and 2.7 grams (0.01 mole) of 3-bromopropyltrimethylammonium bromide was refluxed overnight on the steam bath. The yellow-green, crystalline precipitate which formed on cooling the solution was collected and recrystallized several times from methanol and ether to yield 0.5 gram (18 percent) of 1-(7-hydroxyquinolinium)-3-(trimethylammonium)-propane dibromide, darkening at 230 degrees centigrade, and melting with gas evolution at 234 degrees centigrade.

*Analysis.*—Calculated: C, 44.35; H, 5.46. Found: C, 44.65; H, 5.91.

Example 9

An acetonitrile solution of 5.1 grams (0.032 mole) of 8-methoxyquinoline and 8.35 grams (0.032 mole) of 3-bromopropyltrimethylammonium bromide was refluxed on the steam bath for 24 hours. The crystalline product was collected from the cooled solution and recrystallized twice from n-propyl alcohol and ether to yield 3.45 grams (25.6 percent) of 1-(8-methoxyquinolinium)-3-(trimethylammonium)-propane dibromide, melting point 176.5 degrees centigrade (evolves gas). The salt was very hygroscopic. For analysis it was dried over $P_2O_5$ at 100 degrees centigrade in vacuo.

*Analysis.*—Calculated: C, 45.73; H, 5.76; Br, 38.04. Found: C, 45.39; H, 5.93; Br, 37.65.

Example 10

A mixture of 2.7 grams (0.015 mole) of phenanthridine and 5.75 grams (0.02 mole) of 3-bromopropyl-N-methylpyrrolidinium bromide was dissolved in acetonitrile and the solution refluxed on the steam bath for 24 hours. The resulting precipitate was filtered from the cooled solution and recrystallized from ethanol and ether to yield 1.95 grams (28.3 percent) of 1-(phenanthridinium)-3-(N-methylpyrrolidinium)-propane dibromide, melting point 237.5–238 degrees centigrade.

*Analysis.*—Calculated: C, 54.09; H, 5.62; Br, 34.28. Found: C, 54.53; H, 5.60; Br, 34.22.

Example 11

A solution of 2.5 grams (0.014 mole) of benzo[f]quinoline and 4.3 grams (0.015 mole) of 3-bromopropyl- N-methylpyrrolidinium bromide in acetonitrile was refluxed on the steam bath for 36 hours. The cool acetonitrile solution was decanted from a small amount of oily material and ether slowly added with stirring to the acetonitrile solution. The resulting precipitate was recrystallized from ethanol and ether to yield 1.4 grams (21.6 percent) of 1-(benzo[f]quinolinium)-3-(N-methylpyrrolidinium)-propane dibromide, melting point 221–222 degrees centigrade.

*Analysis.*—Calculated: C, 54.09; H, 5.62; Br, 34.28. Found: C, 54.24; H, 5.55; Br, 33.90.

Example 12

A mixture of 15.8 grams (0.08 mole) of naphthalic anhydride and 8.2 grams (0.08 mole) of dimethylaminopropylamine was heated for 2.5 hours at 180 degrees centigrade (oil bath). The solid reaction mixture was dissolved in chloroform and the chloroform solution washed with aqueous sodium carbonate, water, and then extracted with five percent sulfuric acid. The acid extract was washed with ether, made strongly alkaline, and the product extracted into chloroform. Drying and removal of the solvent left an oil which crystallized on cooling. Two recrystallizations from ethanol afforded 14.1 grams (63 percent) of N-dimethylaminopropyl-1,8-naphthalimide, melting point 118–120 degrees centigrade.

*Analysis.*—Calculated: N (basic), 4.96. Found: N (basic), 4.85.

N-dimethylaminopropyl-1,8-naphthalimide hydrochloride melted at 294 degrees centigrade with gas evolution.

*Analysis.*—Calculated: C, 64.04; H, 6.01; Cl, 11.12. Found: C, 64.63; H, 6.15; Cl, 10.96.

N-dimethylaminopropyl-1,8-naphthalimide methiodide melted at 290 degrees centigrade with gas evolution.

*Analysis.*—Calculated: C, 50.95; H, 4.99; I, 29.91. Found: C, 50.95; H, 4.97; I, 29.74.

Into a two-liter flask equipped with a stirrer, reflux condenser and a dropping funnel was introduced 800 milliliters of dry ether and 6.0 grams (0.16 mole) of lithium aluminum hydride. A solution of 15.0 grams (0.053 mole) of N-dimethylaminopropyl-1,8-naphthalimide in 125 milliliters of dry purified tetrahydrofuran was added dropwise with stirring over a period of twenty minutes (development of green color). Stirring was continued and the slurry refluxed for seven hours. Water was cautiously added to the reaction mixture to decompose the excess lithium aluminum hydride, and the product was taken into dilute acid. Tartaric acid (about ten grams) was added to the acid extract which was then made strongly basic and extracted with ether. The ether layer was washed, dried and the solvent removed. Distillation of the residual oil afforded 6.4 grams (47 percent) of 2-(3-dimethylaminopropyl)-2,3-dihydro-1-benzo[de]isoquinoline, boiling point 154–156 degrees centigrade at 0.5 millimeter $n_D^{25}$ 1.5874.

*Analysis.*—Calculated: C, 80.26; H, 8.72; N, 11.02. Found: C, 79.73; H, 8.59; N, 10.76.

2-(3-dimethylaminopropyl)-2,3-dihydro-1-benzo[de]isoquinoline dihydrochloride melted with gas evolution above 277 degrees centigrade.

*Analysis.*—Calculated: C, 62.38; H, 7.39; Cl, 21.66. Found: C, 62.37; H, 7.21; Cl, 21.15.

A solution of 2.0 grams of the base in 25 milliliters of ethanol was refluxed for two hours with ten milliliters of methyl iodide. The product, which oiled out of the refrigerated solution, solidified on trituration with ethyl acetate. After four recrystallizations from methanol there was obtained 2.0 grams (47 percent) of 2-(3-dimethylaminopropyl)-2,3-dihydro-1-benzo[de]isoquinoline dimethiodide, melting with gas evolution above 241° C.

*Analysis.*—Calculated: C, 43.39; H, 5.24; I, 47.16. Found: C, 42.34; H, 5.30; I, 46.62.

The following table gives the physical properties of other compounds prepared in the manner of the foregoing examples:

| Name | Corr. M.P., ° C. | Analyses | | | | | |
|---|---|---|---|---|---|---|---|
| | | Calcd. | | | Found | | |
| | | C | H | Br | C | H | Br |
| 1-(Isoquinolinium)-3-(triethylammonium) propane dibromide. | 203–205° (decomp.) | 50.00 | 6.54 | 36.97 | 49.42 | 6.60 | 36.33 |
| 1-(Isoquinolinium)-3-(diethylmethylammonium) propane dibromide. | 140° | | | | | | |
| 1-(Isoquinolinium)-4-(trimethylammonium)-3-butene dichloride. | Hygroscopic solid | | | | | | |
| 1-(Isoquinolinium)-5-(trimethylammonium)-pentane dibromide. | 222–225° | 48.81 | 6.28 | 38.21 | 48.50 | 6.47 | 37.57 |
| 1-(4-Bromoisoquinolinium)-3-(trimethylammonium) propane dibromide. | 231–232° | 38.40 | 4.51 | 34.07 (ionic) | 38.59 | 4.75 | 33.89 (ionic) |
| 1-(3-Methylisoquinolinium)-3-(trimethylammonium) propane dibromide. | 226–227 | | | 39.54 | | | 39.16 |
| 1-(Quinolinium)-3-(trimethylammonium)-propane dibromide. | Extremely hygroscopic | | | | | | |
| 1-(8-hydroxyquinolinium)-3-(trimethylammonium) propane dibromide. | 201–202° | 44.35 | 5.46 | 39.35 | 44.15 | 5.57 | 38.71 |
| 1-(Phenanthridinium)-3-(trimethylammonium)-propane dibromide. | 235–236° | 51.83 | 5.49 | 36.31 | 52.15 | 5.61 | 36.59 / 35.70 |

In the same manner as the foregoing examples, other compounds may be prepared within the scope of the present invention, including for example:

1-(isoquinolinium)-2-(N-methylpyrrolidinium)ethane dibromide;

1-(isoquinolinium)-4-(N-methylpyrrolidinium)butane dibromide;

1-(isoquinolinium)-3-(N-methylpiperidinium)propane dibromide;

1-(1-carbethoxyisoquinolinium)-3-(N-methylpyrrolidinium)propane dibromide;

1-(1-methylisoquinolinium)-3-(trimethylammonium) propane dibromide;

1-(6,7-dimethoxyisoquinolinium)-3-(trimethylammonium)propane dibromide;

1-(2-methyl-1,2,3,4-tetrahydroisoquinolinium)-3-(N-methylpyrrolidinium)propane dibromide;

1-(2-butyl-1,2,3,4-tetrahydroisoquinolinium)-3-(trimethylammonium)propane dibromide;

1-(quinaldinium)-3-(trimethylammonium)propane dibromide;

1-(1-methyl-1,2,3,4-tetrahydroquinolinium)-3-(trimethylammonium)propane dibromide;

1-(5-methyl-5,6-dihydrophenanthridinium)-3-(trimethylammonium)propane dibromide;

1-(4-methyl-1,2,3,4-tetrahydrobenzo[f]quinolinium) propane dibromide;

1-(benzo[h]quinolinium)-3-(trimethylammonium) propane dibromide;

2-(3-pyrrolidinopropyl)-2,3-dihydro-1-benz[de] isoquinoline dimethiodide; etc.

Various modifications may be made in the present invention without departing from the spirit or scope thereof, and it is to be understood that we limit ourselves only as defined in the appended claims.

We claim:

1. An α,ω-bis-(quaternary-ammonium)-substituted alkane salt, wherein the alkane portion of the molecule contains from 3 to 12 carbon atoms, inclusive, wherein one quaternary-ammonium group contains up to 10 carbon atoms inclusive, and up to one N-heteromonocyclic group, wherein the other quaternary-ammonium group is a benzopyridine radical, and wherein the anions are non-toxic acid residues.

2. An α,ω-bis-(quaternary-ammonium)-substituted alkane salt, wherein the alkane portion of the molecule contains three carbon atoms, wherein one quaternary-ammonium group contains up to 10 carbon atoms inclusive, and up to one N-heteromonocyclic group, wherein the other quaternary-ammonium group is a benzopyridine radical, and wherein the anions are non-toxic acid residues.

3. An α,ω-bis-(quaternary-ammonium)-substituted alkane salt, wherein the alkane portion of the molecule contains from three to twelve carbon atoms, inclusive, wherein one quaternary-ammonium group contains up to 10 carbon atoms inclusive, and up to one N-heteromonocyclic group, wherein the other quaternary-ammonium group is a benzohydropyridine radical, and wherein the anions are non-toxic acid residues.

4. An α,ω-bis-(quaternary-ammonium)-substituted alkane salt, wherein the alkane portion of the molecule contains three carbon atoms; wherein one quaternary-ammonium group contains up to 10 carbon atoms inclusive, and up to one N-heteromonocyclic group wherein the other quaternary-ammonium group is a benzohydropyridine radical, and wherein the anions are non-toxic acid residues.

5. 1(2 - methyl - 1,2,3,4 - tetrahydroisoquinolinium)-3-(trimethylammonium)propane dibromide.

References Cited in the file of this patent

UNITED STATES PATENTS

| | | |
|---|---|---|
| 2,425,772 | Wilson | Aug. 19, 1947 |
| 2,662,083 | Eastland et al. | Dec. 8, 1953 |

FOREIGN PATENTS

| | | |
|---|---|---|
| 1,002,523 | France | Oct. 31, 1951 |

OTHER REFERENCES

Barlow et al.: Br. J. Pharmacol., volume 3, pages 298–304.

Barlow et al.: Nature, volume 161, page 718 (1948).

Hartwell et al.: J. Am. Chem. Soc., volume 72, pages 2040–44 (1950).